US007463241B2

(12) United States Patent
Ushimaru et al.

(10) Patent No.: US 7,463,241 B2
(45) Date of Patent: Dec. 9, 2008

(54) JOYSTICK INPUT DEVICE

(75) Inventors: Hiroshi Ushimaru, Miyagi-ken (JP); Yukiharu Hayashi, Miyagi-ken (JP); Tomoaki Nakai, Saitama-ken (JP); Masaki Sato, Saitama-ken (JP); Kazumiki Yoshitake, Saitama-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 560 days.

(21) Appl. No.: 10/963,997

(22) Filed: Oct. 12, 2004

(65) Prior Publication Data

US 2005/0190153 A1 Sep. 1, 2005

(30) Foreign Application Priority Data

Oct. 14, 2003 (JP) ............................ 2003-353905
Oct. 14, 2003 (JP) ............................ 2003-353927

(51) Int. Cl.
*G06F 3/033* (2006.01)
*G05G 9/047* (2006.01)
*A63F 13/08* (2006.01)

(52) U.S. Cl. ....................... 345/161; 345/156; 345/157; 463/38; 74/471 XY

(58) Field of Classification Search ......... 345/156–167; 463/38; 74/471 R, 471 XY
See application file for complete search history.

(56) References Cited

U.S. PATENT DOCUMENTS 4,000,382 A 12/1976 Kolb
4,625,084 A 11/1986 Fowler et al.
4,784,008 A 11/1988 Paquereau et al.
5,421,694 A * 6/1995 Baker et al. ................. 414/694
5,468,924 A * 11/1995 Naitou et al. ............... 200/6 A
5,559,432 A * 9/1996 Logue ................... 324/207.17
5,754,168 A * 5/1998 Maynard, Jr. ............... 345/163
5,831,596 A * 11/1998 Marshall et al. ............. 345/161

(Continued)

FOREIGN PATENT DOCUMENTS

DE 44 43 726 6/1995

(Continued)

OTHER PUBLICATIONS

Search Report dated Dec. 21, 2004 for European Patent Application No. 04 02 4299.

*Primary Examiner*—My-Chau T Tran
(74) *Attorney, Agent, or Firm*—Brinks Hofer Gilson & Lione

(57) ABSTRACT

A joystick input device includes a casing having a tiltable-component supporter, a tiltable component held in the tiltable-component supporter, tilt-detecting means for detecting a state of tilting of the tiltable component, a pushable component held in the tiltable component, push-detecting means for detecting a state of pushing of the pushable component, and an operation component for performing a tilt operation of the tiltable component and a push operation of the pushable component. The tiltable-component supporter has a pushable-component through-hole through which the leading edge of the pushable component can pass. The tiltable-component supporter regulates a tilt operation of the tiltable component when the leading edge of the pushable component passes through the pushable-component through-hole. A pushable-component stopping portion is formed around the pushable-component through-hole to regulate a push operation of the pushable component when the tiltable component is tilted.

6 Claims, 8 Drawing Sheets

U.S. PATENT DOCUMENTS

| | | | | |
|---|---|---|---|---|
| 5,847,694 | A * | 12/1998 | Redford et al. | 345/158 |
| 6,266,046 | B1 * | 7/2001 | Arita | 345/156 |
| 6,362,810 | B1 * | 3/2002 | Matsuda | 345/161 |
| 6,694,236 | B2 * | 2/2004 | Onodera | 701/36 |
| 6,809,661 | B1 * | 10/2004 | Badarneh | 341/31 |
| 7,079,110 | B2 * | 7/2006 | Ledbetter et al. | 345/156 |
| 7,096,199 | B2 * | 8/2006 | Lapstun et al. | 705/40 |
| 7,187,358 | B2 * | 3/2007 | Ledbetter et al. | 345/156 |
| 7,280,098 | B2 * | 10/2007 | Komelson | 345/161 |

FOREIGN PATENT DOCUMENTS

| | | |
|---|---|---|
| EP | 0 282 817 | 9/1988 |
| EP | 0 656 640 | 6/1995 |
| EP | 1 215 556 | 6/2002 |
| JP | 7-30431 | 6/1995 |

* cited by examiner

JOYSTICK INPUT DEVICE

This application claims the benefit of priority to Japanese Patent Application No. 2003-353905 and 2003-353927 filed on Oct. 14, 2003, herein incorporated by reference.

BACKGROUND OF THE INVENTION

1. Field of the Invention

The present invention relates to joystick input devices used as controllers for automotive electrical systems or the like. In particular, the present invention relates to means for providing an operational feel of moving in parallel with a panel surface to a user through a tilt-operation knob.

2. Description of the Related Art

Joystick input devices having tiltable components, tilt-operation knobs for operating the tiltable components in a tilt direction, and means for detecting the tilt direction and serving as controllers for automotive electrical systems, such as a car navigation system, or a car audio system, have been known.

FIG. 13 is a cross-sectional view of one such known joystick input device. This joystick input device includes: a casing 101 consisting of an upper casing unit 101*a* and a lower casing unit 101*b*; a wiring board 102 held in the casing 101; a flexible sheet 103 attached to the wiring board 102 and having dome portions 103*a*; tilt-operation sheet switches 104 (tilt-detecting means), a push-button sheet switch 105, and rotating-operation sheet switches 106, each having a fixed contact (not shown) formed on the surface of the wiring board 102 and a conductive material body (not shown) formed on the top of each of the dome portions 103*a*; an X-Y operating unit 107 supported by the upper casing unit 101*a* so as to be freely tiltable and arranged such that the lower edge of the X-Y operating unit 107 is opposed to the tilt-operation sheet switches 104; a shaft (a tiltable component) 108 for a tilt operation and a slide operation supported by the X-Y operating unit 107 so as to be freely slidable and arranged such that the lower edge of the shaft 108 is opposed to the push-button sheet switch 105; an operation component (a tilt-operation knob) 109 for both a tilt operation and a push operation integrated with the upper edge of the shaft 108; a spring 110 stretched between the upper casing unit 101*a* and the shaft 108; a turning knob 111 supported by the upper casing unit 101*a* so as to be freely turnable; and a turn-operation unit 112 connected to the turning knob 111 and opposed to the rotating-operation sheet switches 106 (see, for example, Japanese Unexamined Utility Model Registration Application Publication No. 7-30431).

In this known joystick input device, when a force is applied on the shaft 108 laterally, the shaft 108 and the X-Y operating unit 107 are tilted in the direction of the force while resisting an elastic force of the spring 110. In accordance with the direction of the force, a required dome portion 103*a* is then selectively compressed by the end of the X-Y operating unit 107, and at least one or two of the tilt-operation sheet switches 104 are selectively switched to conduction. When a force is applied on the shaft 108 in the axial direction, the shaft 108 is slid in the X-Y operating unit 107 while resisting an elastic force of the spring 110. Another dome portion 103*a* is then compressed by the end of the shaft 108, and the push-button sheet switch 105 is selectively switched to conduction. When a force is applied on the turning knob 111 in a direction of rotation, the turning knob 111 and the turn-operation unit 112 are turned in the direction of the force. An operational element 112*a* of the turn-operation unit 112 comes into contact with a side of a required dome portion 103*a*, and therefore, the required dome portion 103*a* is tilted, so that the rotating-operation sheet switches 106 are selectively switched to conduction.

As a result, systems can be controlled by the use of contact signals supplied from one or two of the tilt-operation sheet switches 104, from the push-button sheet switch 105, and from the rotating-operation sheet switches 106.

When this type of a joystick input device is used as a controller for an automotive electrical system, a driver must operate the operation component 109 or the turning knob 111 without having to stop looking ahead while driving the car, and therefore, it is highly necessary that the joystick input device have ease of use to reliably avoid an operating error.

However, the above-described known joystick input device has no means for regulating a tilt operation of the shaft 108 or means for regulating a slide operation thereof, and therefore, both operations of the shaft 108 can be carried out simultaneously. As a result, for example, in a case where a cursor movement on a display unit in a car navigation system is controlled based on a contact signal supplied from the tilt-operation sheet switches 104 upon a tilt operation of the shaft 108 and a selection from menu buttons appearing on the display unit in the car navigation system is controlled based on a contact signal supplied from the push-button sheet switch 105 upon a slide operation of the shaft 108, a slide operation is prone to interrupt a tilt-operation process or, in contrast, a tilt operation is prone to interrupt a slide-operation process. Therefore, there is a problem in that it is difficult to reliably select a desired menu button without having to look at the input device.

In order to enhance the upscale image in a car having this type of a joystick input device, it may be desired that, when the tilt-operation knob is tilted in the tilt direction of the tiltable component, the feel of moving in parallel with a surface of a panel to which the joystick input device is mounted be provided to a user through the tilt-operation knob, not that the direct feel of tilt of the tiltable component be provided to a user through the tilt-operation knob.

A structure in which the feel of parallel movement is provided to a user through the tilt-operation knob can be achieved by the provision of means for guiding the tilt-operation knob in the direction parallel to the panel and means for conveying an operation force of the tilt-operation knob to the tiltable component between the tilt-operation knob and the tiltable component. However, this process complicates the entire structure, and therefore, increases the cost of the joystick input device. As a result, this process is not realized in practice. If the length of the tiltable component is increased, the tilt-operation knob can have a pseudo-feel of parallel movement. However, in a known joystick input device, the lower casing unit 101*b* is mounted on a panel P, as described in FIG. 13. Therefore, if the length of the shaft (tiltable component) 108 is increased, the operation component (tilt-operation knob) 109 protrudes significantly in the cabin of the car, and this has adverse effects on the look of the car's interior and on the safety. For this reason, enlargement of the length of the shaft (tiltable component) 108 is limited and it is difficult to provide the operation component (tilt-operation knob) 109 with a good operational feel of parallel movement.

SUMMARY OF THE INVENTION

The present invention is achieved to solve the above problems in known devices. It is an object of the present invention to provide a joystick input device allowing a user to reliably control an automotive electrical system without having to look at the joystick input device.

It is an object of the present invention to provide a joystick input device that has a simple structure, provides a pseudo-feel of parallel movement to a user through a tilt-operation knob, and achieves a good look of a car's interior and excellent safety.

According to a first aspect of the present invention, a joystick input device includes a casing having a tiltable-component supporter, a tiltable component held by the tiltable-component supporter and extending in a direction away from a tilt center, tilt-detecting means for detecting a state of tilting of the tiltable component, a pushable component held by the tiltable component, push-detecting means for detecting a state of pushing of the pushable component, and an operation component for performing a tilt operation of the tiltable component and a push operation of the pushable component. The casing has an operation-regulating portion disposed away from the tilt center, and the operation-regulating portion includes a pushable-component through-hole through which the leading edge of the pushable component is capable of passing and a pushable-component stopping portion disposed around the pushable-component through-hole. The pushable-component through-hole regulates a tilt operation of the tiltable component when the leading edge of the pushable component passes through the pushable-component through-hole, and the pushable-component stopping portion regulates a push operation of the pushable component when the tiltable component is tilted.

As described above, the pushable-component through-hole and the pushable-component stopping portion are formed in the tiltable-component supporter. In a state in which the pushable component is pushed and the leading edge of the pushable component passes through the pushable-component through-hole, when the tiltable component is subjected to a tilt operation in a tilt direction, the outer face of the pushable component is in contact with the inner face of the pushable-component through-hole, and therefore, the tilt operation of the tiltable component is regulated. In a state in which the tiltable component is tilted, when the pushable component is subjected to a push operation in the direction to be pushed, the leading edge of the pushable component is in contact with the pushable-component stopping portion, and therefore, the push operation is regulated. As a result, the tiltable component and the pushable component are prevented from being simultaneously operated with reliability, and therefore, a user can reliably control an automotive electrical system without having to look at the input device.

In the joystick input device of the first aspect of the present invention, the operation-regulating portion may be disposed adjacent to the operation component away from the tilt center.

It is therefore not necessary to extend the tiltable component in a direction opposite to the operation component beyond the tilt center. This assures a high degree of flexibility in the design of an adjacent area of the tilt center.

In the joystick input device of the first aspect of the present invention, the tiltable-component supporter may include the operation-regulating portion having the pushable-component through-hole and the pushable-component stopping portion at a spherical sliding contact face thereof, and a sliding portion of the tiltable component may slide on the sliding contact face so that the tiltable component is tiltably held.

As described above, the structure in which the operational-direction regulating unit is included in the tiltable-component supporter does not require a space for the operation-regulating portion. This assures a high degree of flexibility of the design of the adjacent area of the tilt center.

According to a second aspect of the present invention, a joystick input device includes a tiltable component having a tilt shaft and driving legs extending radially from an end of the tilt shaft, tilt-detecting means for detecting a direction of tilting of the tiltable component, the tilt-detecting means being driven by the driving legs, a tilt-operation knob attached to the other end of the tilt shaft, and a casing accommodating the driving legs and the tilt-detecting means. The joystick input device is mounted to a panel having a cylindrical input-device holding portion with the tilt-operation knob exposed. A panel-mounting portion extending in the axial direction of the tilt shaft, accommodating the tilt shaft, and being inserted into the cylindrical input-device holding portion of the panel is mounted to the casing.

As described above, the cylindrical panel-mounting portion, which accommodates the tilt shaft and is inserted into the cylindrical input-device holding portion of the panel, is mounted to the casing accommodating the driving leg and the tilt-detecting means. Thus, the length of the tilt shaft can be longer by the length of the panel-mounting portion, and therefore, the radius of tilt of the tilt-operation knob can be longer. As a result, the tilt-operation knob can have the operational feel of nearly parallel movement without complicating the structure. Additionally, since the joystick input device is mounted to the panel by inserting the cylindrical panel-mounting portion into the cylindrical input-device holding portion of the panel, the length of a section that protrudes from the surface of the panel in the tilt-operation knob is reduced. Therefore, when the joystick input device is used as a controller of an automotive electrical system, the look of the car's interior and the safety are good.

In the joystick input device of the second aspect of the present invention, the outer diameter of the panel-mounting portion may be smaller than the length and width of the casing, and the joystick input device may be mounted to the panel having an overhanging portion covering a multilevel section between the panel-mounting portion and the casing.

As described above, the area of the base of the panel-mounting portion is smaller than that of the casing, so that the panel has the overhanging portion covering the multilevel section between the panel-mounting portion and the casing. As a result, the overhanging portion can accommodate a desired electric component or the like in an inner space thereof. Therefore, an inner space of the panel can be used effectively.

In the joystick input device of the second aspect of the present invention, the joystick input device may be mounted to the panel having a projecting portion protruding from the overhanging portion in the longitudinal direction of the panel-mounting portion.

As described above, the panel has the projecting portion protruding from the overhanging portion of the panel in the longitudinal direction of the panel-mounting portion of the joystick input device, so that the length of the tilt shaft can be longer by the length of height of the projecting portion and the radius of tilt of the tilt-operation knob can be further longer. As a result, the tilt-operation knob can have the operational feel of more nearly parallel movement. The inner space of the overhanging portion can be larger by the size of the projecting portion, and therefore, the inner space of the panel can be used more effectively.

The joystick input device of second aspect of the present invention may further include a cylindrical rotatable unit accommodated inside the panel-mounting portion, and a turning knob connected to the rotatable unit and disposed between the projecting portion and the tilt-operation knob.

As described above, the turning knob is disposed between the projecting portion and the tilt-operation knob, so that the length of the tilt shaft can be longer by the length of the turning knob and the radius of tilt of the tilt-operation knob can be further longer. Therefore, the tilt-operation knob can have the operational feel of more nearly parallel movement. The rotatable unit is rotated by the turning knob, so that the joystick input device can be multifunctional.

According to a third aspect of the present invention, an input device includes a casing, a cylindrical panel-mounting portion extending from the casing, the outer diameter of the cylindrical panel-mounting portion being smaller than the length and width of the casing, a rotatable unit having a cylindrical portion arranged inside the panel-mounting portion, a detected part rotating in accordance with rotation of the cylindrical portion, and rotation-detecting means for detecting a state of rotation of the rotatable unit on the basis of a physical change brought by rotation of the detected part. The rotatable unit has a collar portion protruding from the cylindrical portion and extending beyond the panel-mounting portion and within the casing, and the detected part is disposed in the outer region of the collar portion.

As described above, the rotatable unit has the collar portion extending from the cylindrical portion thereof, and the detected part is disposed in the outer region of the collar portion. Compared with when the detected part is formed in an edge of the cylindrical portion, the radius of rotation of the detected part is longer and the physical change is larger. Accordingly, even when the rotation-detecting means has a low resolution, the state of rotation of the rotatable unit can be detected with high precision.

According to a fourth aspect of the present invention, an input device includes a casing, a cylindrical panel-mounting portion extending from the casing, the outer diameter of the cylindrical panel-mounting portion being smaller than the length and width of the casing, a rotatable unit having a cylindrical portion arranged inside the panel-mounting portion, a light-shielding plate rotating in accordance with rotation of the cylindrical portion, and a photo-interrupter for detecting a state of rotation of the rotatable unit. The photo-interrupter includes a light-emitting element and a photoreceptor element. The light-emitting element and the photoreceptor element are disposed on opposite sides of a path for passing the light-shielding plate therebetween. The rotatable unit has a collar portion protruding from the cylindrical portion and extending beyond the panel-mounting portion and within the casing, and the light-shielding plate is disposed in the outer region of the collar portion.

As described above, the rotatable unit has the collar portion extending from the cylindrical portion thereof, and the light-shielding plate is disposed in the outer region of the collar portion. Compared with when the light-shielding plate is formed in an edge of the cylindrical portion, the radius of rotation of the light-shielding plate is longer and the change in the state of rotation is larger. Accordingly, even when the photo-interrupter has a lower resolution, the state of rotation of the rotatable unit can be detected with high precision.

The input device according to the third or the fourth aspect of the present invention may further include an operational-feel providing portion having a small protrusion rotating in accordance with rotation of the rotatable unit and a contact member coming into contact with the small protrusion. The small protrusion is disposed in the inner region of the collar portion.

As described above, the collar portion externally protruding is used for not only detecting rotation but also serving as the operational-feel providing portion. As a result, a space required for the operational-feel providing portion can be reduced.

In the joystick input device according to the present invention, the pushable-component through-hole and the pushable-component stopping portion are formed in the tiltable-component supporter. As a result, a tilt operation of the tiltable component and a push operation of the pushable component are prevented from being simultaneously operated, and therefore, a user can reliably control an automotive electrical system or the like without having to look at the joystick input device.

In the joystick input device according to the present invention, the panel-mounting portion, which accommodates the tilt shaft and is inserted into the cylindrical input-device holding portion of the panel, is mounted to the casing accommodating the driving leg and the tilt-detecting means. Thus, the length of the tilt shaft can be longer by the length of the panel-mounting portion, and therefore, the radius of tilt of the tilt-operation knob can be longer. As a result, the tilt-operation knob can have the operational feel of nearly parallel movement without complicating the structure. Additionally, since the joystick input device is mounted to the panel by inserting the cylindrical panel-mounting portion into the cylindrical input-device holding portion of the panel, the length of a section that protrudes from the surface of the panel in the tilt-operation knob can be reduced. Therefore, when the joystick input device is used as a controller of an automotive electrical system, the look of the car's interior and the safety are good.

DESCRIPTION OF THE PREFERRED EMBODIMENTS

Figure 1:
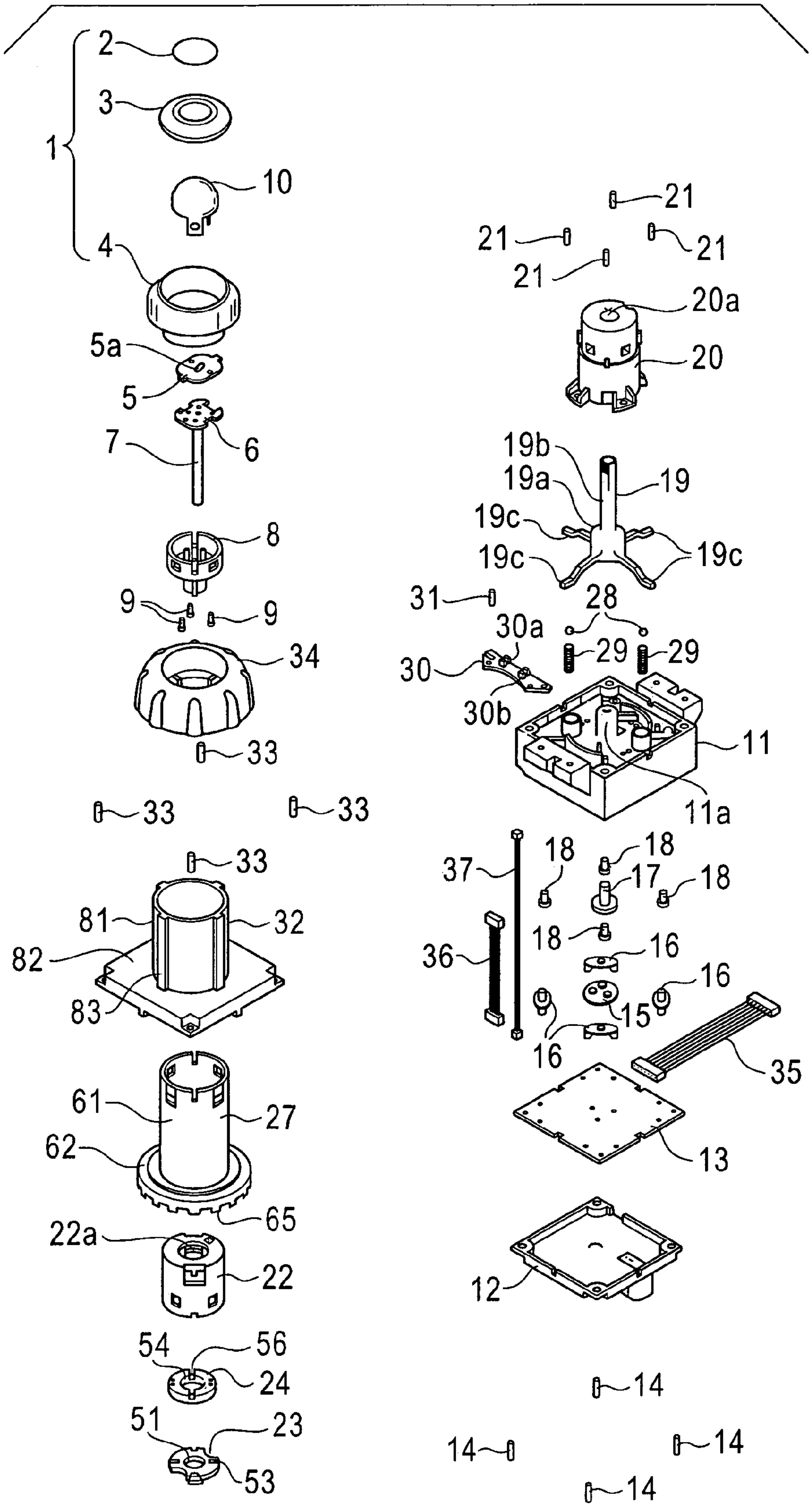
FIG. 1 is an exploded perspective view of a joystick input device according to an embodiment of the present invention.
Figure 2:
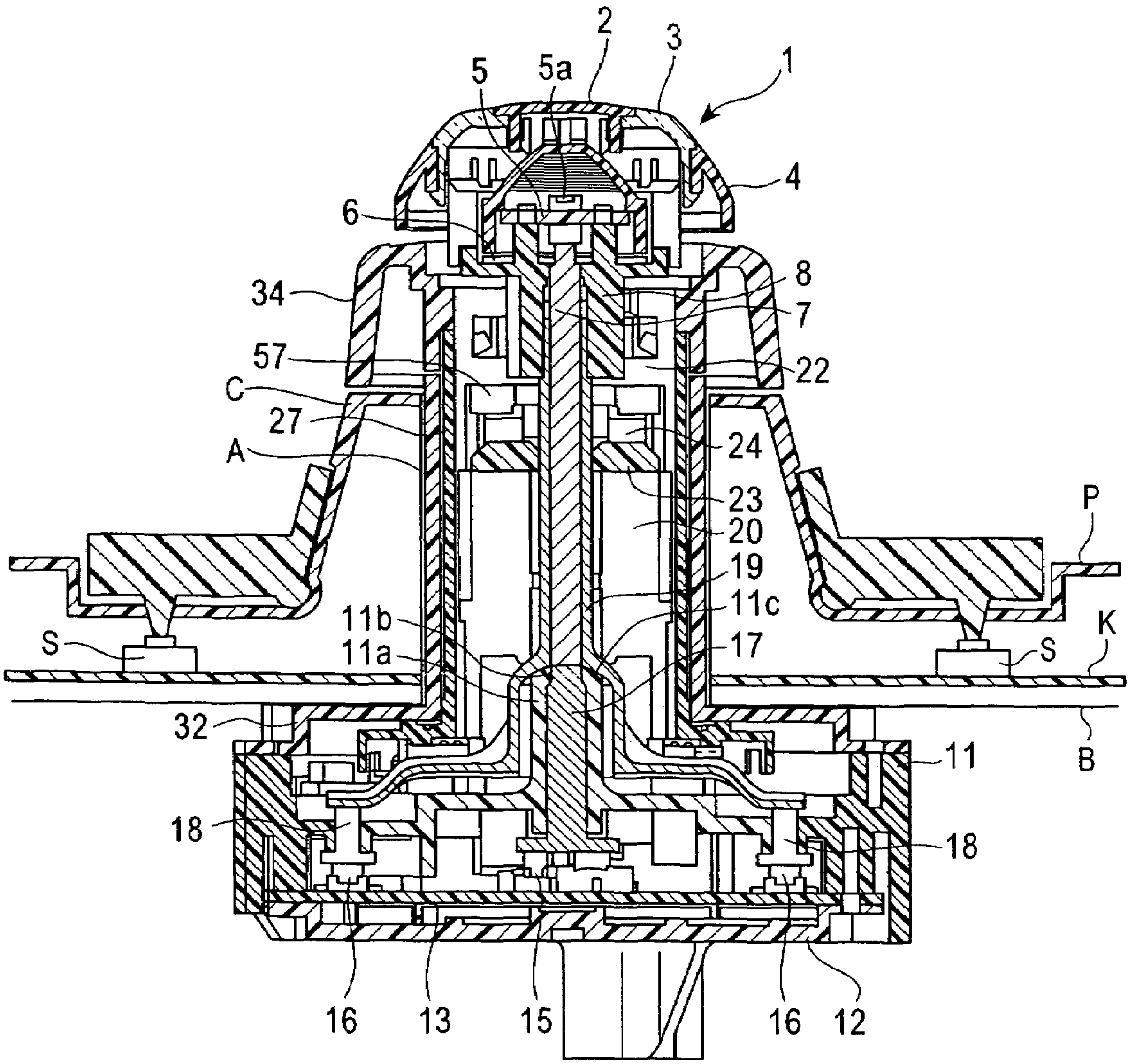
FIG. 2 is a cross-sectional view showing when the joystick input device according to the embodiment is not operated.
Figure 3:
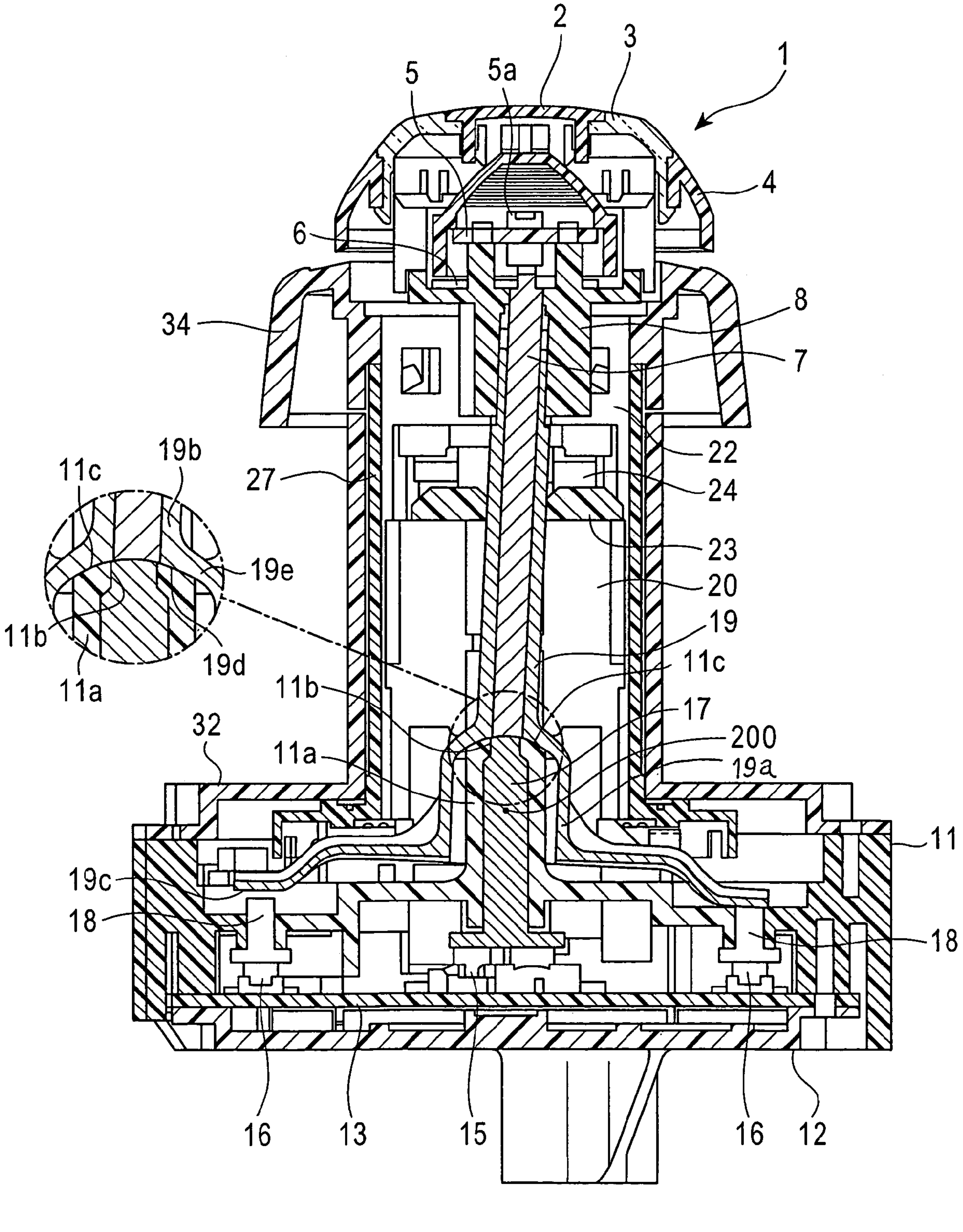
FIG. 3 is a cross-sectional view showing when the joystick input device according to the embodiment is subjected to a tilt operation.

A preferred embodiment of the present invention will now be described with reference to FIGS. 1 to 9. FIG. 1 is an exploded perspective view of a joystick input device according to this embodiment of the present invention. FIG. 2 is a cross-sectional view showing when the joystick input device according to the embodiment is not operated. FIG. 3 is a cross-sectional view showing when the joystick input device according to the embodiment is subjected to a tilt operation.

Figure 4:
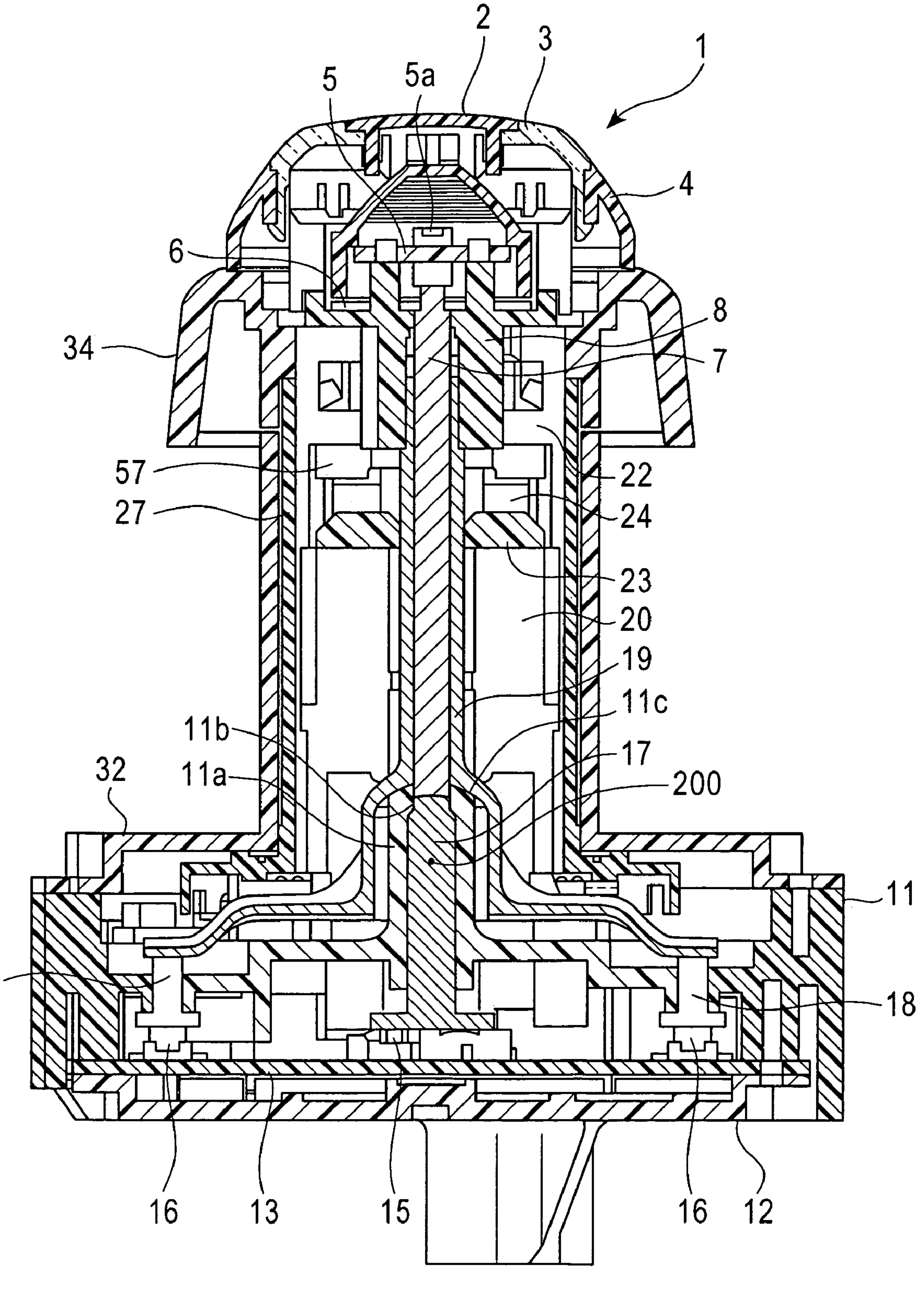
FIG. 4 is a cross-sectional view showing when the joystick input device according to the embodiment is subjected to a push operation.
Figure 5:
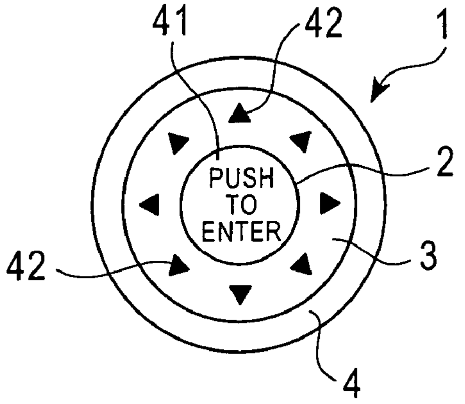
FIG. 5 is a plan view of an operation component for performing a tilt operation and a push operation.
Figure 6:
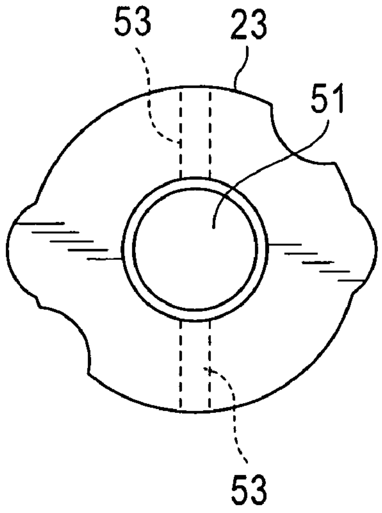
FIG. 6 is a bottom plan view of a first slider.
Figure 7:
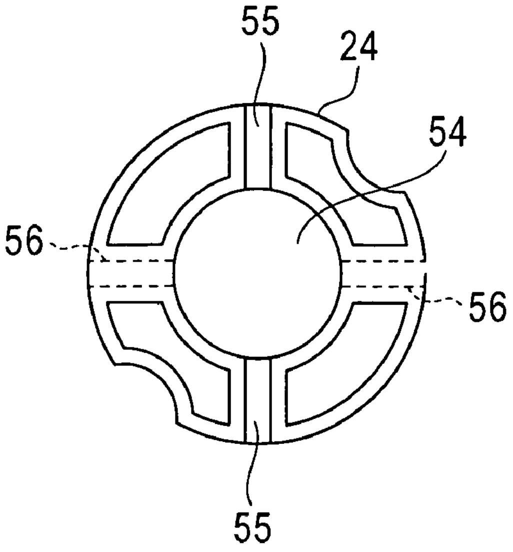
FIG. 7 is a bottom plan view of a second slider.
Figure 8:
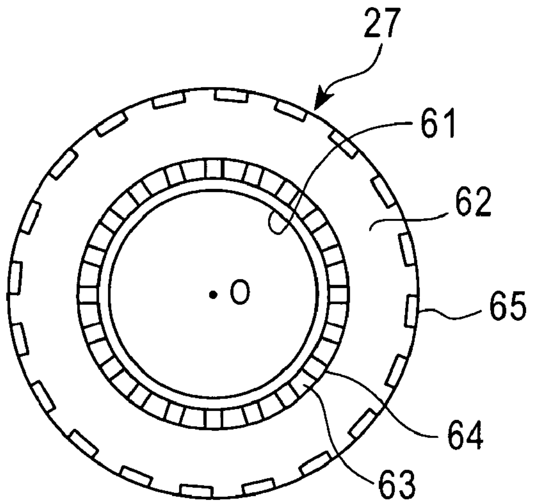
FIG. 8 is a bottom plan view of a rotatable unit.
Figure 9:
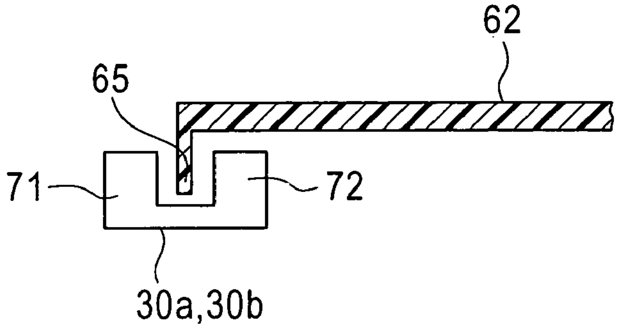
FIG. 9 is a cross-sectional view showing how a photo-interrupter is arranged relative to a light-shielding plate.

FIG. 4 is a cross-sectional view showing when the joystick input device according to the embodiment is subjected to a push operation. FIG. 5 is a plan view of an operation component for performing a tilt operation and a push operation. FIG. 6 is a bottom plan view of a first slider. FIG. 7 is a bottom plan view of a second slider. FIG. 8 is a bottom plan view of a rotatable unit. FIG. 9 is a cross-sectional view showing how a photo-interrupter is arranged relative to a light-shielding plate.

As shown in FIG. 1, the joystick input device of this embodiment has: an operation component 1 for performing a tilt operation and a push operation (a tilt-operation knob) including a non-translucent cap 2, a translucent cap 3, and a knob body 4; a first wiring board 5 having a light-emitting body 5*a*, such as a light-emitting diode, and disposed inside the knob body 4; a stopping plate 6 holding the first wiring board 5; a pushable component 7 suspended from the bottom of the stopping plate 6; a knob holder 8 holding the first wiring board 5, the stopping plate 6, and the pushable component 7; screws 9 securing the stopping plate 6 to the knob holder 8; a light-emitting-body cover 10 joined to the knob holder 8 by a snap fit and covering the periphery of the light-emitting body 5*a* mounted on the first wiring board 5; a lower casing 11 including a hollow tiltable-component supporter 11*a*; a lower cover 12 attached to the bottom of the lower casing 11; a second wiring board 13 accommodated in a space defined between the lower casing 11 and the lower cover 12; screws 14 integrally securing the lower casing 11, the lower cover 12, and the second wiring board 13; a push-detecting-switch (push-detecting means) rubber contact 15 disposed on the second wiring board 13; four tilt-detecting-switch (tilt-detecting means) rubber contacts 16 disposed on the second wiring board 13; a push-detecting-switch driving bar 17 whose bottom is in contact with the push-detecting-switch rubber contact 15; four tilt-detecting-switch driving bars 18 whose bottoms are in contact with the tilt-detecting-switch rubber contacts 16; a tiltable component 19 including a hollow tilt shaft 19*b* and supported on the top of the tiltable-component supporter 11*a*; a cylindrical tilt-shaft holder 20 including a hole 20*a* through which the tilt shaft 19*b* passes and fixed to the lower casing 11; screws 21 securing the tilt-shaft holder 20 to the lower casing 11; a cylindrical slider holder 22 including a hole 22*a* through which the tilt shaft 19*b* passes and mounted on the tilt-shaft holder 20 with a predetermined space therebetween; a first slider 23 and a second slider 24, both of which are arranged in a space defined between the top of the tilt-shaft holder 20 and the top of the slider holder 22; a cylindrical rotatable unit 27 disposed outside the tilt-shaft holder 20 and the slider holder 22 and inside a panel-mounting portion 81 so as to be freely turnable; two balls (contact members) 28 mounted on the lower casing 11 and being in contact with the bottom of the rotatable unit 27; two springs 29 urging the balls 28 toward the rotatable unit 27; a third wiring board 30 provided with two photo-interrupters 30*a* and 30*b*, which serve as detecting means, and disposed on the lower casing 11; a screw 31 securing the third wiring board 30 to the lower casing 11; an upper casing 32 through which the rotatable unit 27 passes, the upper casing 32 being attached to the top surface of the lower casing 11; screws 33 securing the upper casing 32 to the lower casing 11; a turning knob 34 joined to the top of the rotatable unit 27 by a snap fit; and a first harness 35, a second harness 36, and a third harness 37 for connecting the wiring boards.

The stopping plate 6, the pushable component 7, the screws 9, 14, 21, 31, and 33, the tiltable component 19, the springs 26 and 29, and the balls 28 are formed from metal materials; other members are formed from insulating resin materials.

The operation component 1 is assembled by joining the non-translucent cap 2 to the translucent cap 3 by a snap fit and joining the translucent cap 3 to the knob body 4 by a snap fit. As shown in FIG. 5, characters 41 reading "PUSH" on the surface of the non-translucent cap 2 indicate that the operation component 1 serves as a button. On the surface of the translucent cap 3, eight arrows 42, which are displayed radially and spaced uniformly, indicate that the operation component 1 serves as a tilt-operation knob. The arrows 42 on the translucent cap 3 are illuminated by the light-emitting body 5*a* mounted on the first wiring board 5 so that the user can easily operate the operation component 1 even at nighttime. The operation component 1 is joined to the periphery of the knob holder 8 by a snap fit.

The first wiring board 5 is joined to the stopping plate 6 by a snap fit, and the stopping plate 6 is secured to the knob holder 8 by the screws 9. The pushable component 7, which is suspended from the bottom of the stopping plate 6, passes through a hole formed through the knob holder 8 so as to project below the knob holder 8.

The light-emitting-body cover 10 is shaped like a dome and made of a transparent or translucent material so as to evenly illuminate the surface of the translucent cap 3 with light from the light-emitting body 5*a*. This light-emitting-body cover 10 is joined to the knob holder 8 by a snap fit.

On the surface of the second wiring board 13, a fixed contact for the push-detecting switch, fixed contacts for the tilt-detecting switches, and necessary wiring, all of which are not shown, are formed in a predetermined arrangement. The push-detecting-switch rubber contact 15 is opposed to the fixed contact for the push-detecting switch, and the tilt-detecting-switch rubber contacts 16 to the fixed contacts for the tilt-detecting switches. The inner face of a dome-shaped projection of each of the push-detecting-switch rubber contact 15 and the tilt-detecting-switch rubber contacts 16 has a movable contact for electrically connecting each of the fixed contacts formed on the surface of the second wiring board 13 so that a desired switching signal can be output by elastically deforming the dome-shaped projection of each of the push-detecting-switch rubber contact 15 and the tilt-detecting-switch rubber contacts 16 and thereby electrically connecting the fixed contacts and the movable contacts. As shown in FIGS. 2 to 4, the push-detecting-switch rubber contact 15 is disposed in the axis of the hollow tiltable-component supporter 11*a* of the lower casing 11, and the tilt-detecting-switch rubber contacts 16 are evenly spaced and arranged circumferentially about the axis of the tiltable-component supporter 11*a*.

In the push-detecting-switch driving bar 17, the upper portion thereof is inserted into the tiltable-component supporter 11*a* of the lower casing 11 so as to be freely slidable, and the lower edge thereof is in contact with the top of the push-detecting-switch rubber contact 15. Each of the four tilt-detecting-switch driving bars 18 is disposed in the lower casing 11 so as to be vertically movable and the lower edge of each of the tilt-detecting-switch driving bars 18 is in contact with the top of each of the tilt-detecting-switch rubber contacts 16.

The tiltable component 19 includes a large-diameter portion 19*a* into which the tiltable-component supporter 11*a* of the lower casing 11 is inserted, the small-diameter tilt shaft 19*b* projecting upwardly from the top of the large-diameter portion 19*a*, and four driving legs 19*c* extending radially from the bottom of the large-diameter portion 19*a*. The inside diameter of the large-diameter portion 19*a* is such that the tiltable-component supporter 11*a* of the lower casing 11 is inserted loosely, and the top end of the large-diameter portion 19*a* constitutes a sliding portion 19*e* including a spherical sliding face 19*d*, which slides on a sliding face 11*c* (described below). The top end of the tiltable-component supporter 11*a* of the lower casing 11 has a smaller diameter than the spherical sliding face 19*d* formed in the inner surface of the large-diameter portion 19*a* and includes the spherical sliding face 11*c*, on which the spherical sliding face 19*d* slides. The top end of the tiltable-component supporter 11*a* of the lower casing 11 is spherically shaped with a smaller diameter than that of a spherical inner area of the large-diameter portion 19*a*. As a result, as shown in FIGS. 2 to 4, the tiltable-component supporter 11*a* is inserted into the large-diameter portion 19*a*, and both spherical faces are butted against each other, and therefore, the tiltable component 19 is supported by the tiltable-component supporter 11*a* so as to be freely tiltable. At this time, as shown in FIGS. 2 and 3, a tilt center 200 is positioned at a distance of the radius from the sphere. As is evident from these drawings, the pushable component 7 passes through the hole of the tilt shaft 19*b*, the bottom of the pushable component 7 is butted against the top of the push-detecting-switch driving bar 17 inserted into the tiltable-component supporter 11*a*, and the leading edges of the driving legs 19*c* are in contact with the top ends of the tilt-detecting-switch driving bars 18.

As shown in FIGS. 1 to 4, a pushable-component through-hole 11*b* through which the leading edge of the pushable component 7 can pass is formed in the center of the upper portion of the tiltable-component supporter 11*a*. The diameter of the pushable-component through-hole 11*b* is designed so as to be slightly larger than the diameter of the leading edge of the pushable component 7. When the leading edge of the pushable component 7 passes through the pushable-component through-hole 11*b*, a tilt operation of the pushable component 7 and the tiltable component 19 is regulated so that the fixed contacts and the movable contacts, both of which constitute the tilt-detecting switches, are not electrically connected together. The outer region of the pushable-component through-hole 11*b* at the upper portion of the tiltable-component supporter 11*a* serves as a pushable-component stopping portion (the sliding face 11*c*) to prevent the pushable component 7 from entering the pushable-component through-hole 11*b* by coming into contact with the leading edge of the pushable component 7 when the pushable component 7 and the tiltable component 19 are tilted and the pushable component 7 is then subjected to a push operation.

In other words, the lower casing 11 has an operation-regulating portion including the pushable-component through-hole 11*b* and the pushable-component stopping portion (the sliding face 11*c*). The operation-regulating portion is disposed near the operation component 1 away from the tilt center 200.

The tilt-shaft holder 20 is secured to the top surface of the lower casing 11 by the screws 21. The slider holder 22 is joined to the top of the tilt-shaft holder 20 by a snap fit. Therefore, a space for accommodating the first slider 23 and the second slider 24 is provided between the top of the tilt-shaft holder 20 and that of the slider holder 22.

The first slider 23 is slid in the tilt direction or the turn direction in response to a tilt operation or a turn operation of the tiltable component 19. The second slider 24 is used for preventing the first slider 23 from rotating about the tiltable component 19 when the tiltable component 19 is subjected to a tilt operation or a turn operation.

The first slider 23 is annular and has a central hole 51. The central hole 51 can come into contact with the periphery of the tilt shaft 19*b* when the first slider 23 slides. The first slider 23 is disposed outside the tilt shaft 19*b*. As indicated by short dashed lines in FIG. 6, two ribs 53 engaging the second slider 24 are aligned on the top surface of the first slider 23.

The second slider 24 is annular and has a central hole 54. The central hole 54 does not come into contact with the tilt shaft 19*b* when the second slider 24 slides. The second slider 24 is disposed outside the tilt shaft 19*b*, but it is not directly controlled by the tilt shaft 19*b*. As shown in FIG. 7, grooves 55 and grooves 56 are formed on the bottom and top surfaces of the second slider 24, respectively, in such a manner that the grooves 55 are orthogonal to the grooves 56. The grooves 55 on the bottom surface of the second slider 24 mesh with the ribs 53 on the top surface of the first slider 23, and the grooves 56 on the top surface of the second slider 24 mesh with ribs 57, which are formed on the top of the slider holder 22 (see FIGS. 2 to 4).

Accordingly, when the tiltable component 19 is tilted in the direction orthogonal to the ribs 53, both the first slider 23 and the second slider 24 are moved in the direction orthogonal to the ribs 53. When the tiltable component 19 is tilted in the direction parallel to the ribs 53, only the first slider 23 is moved in the direction parallel to the ribs 53. As a result, the first slider 23, the second slider 24, and the slider holder 22 mesh with each other all the time, and therefore, the first slider 23 is not rotated about the tilt shaft 19*b* when the tiltable component 19 is subjected to a tilt operation or a turn operation.

In this embodiment, the tilt-detecting-switch rubber contacts 16 function as means for providing a tilt-operation operational feel.

The rotatable unit 27 includes a cylindrical portion 61 and a collar portion 62. The cylindrical portion 61 has a diameter larger than that of each of the tilt-shaft holder 20 and the slider holder 22. The collar portion 62 protrudes from the bottom end of the cylindrical portion 61 in a direction at right angles thereto and extends beyond the panel-mounting portion 81 and within the lower casing 11. The top of the cylindrical portion 61 is joined to the turning knob 34 by a snap fit. As shown in FIG. 8, on the bottom surface of the collar portion 62, an operational-feel providing portion 64 including many small protrusions 63 arranged circumferentially about the center O of rotation of the rotatable unit 27 with equal spacing is provided. The collar portion 62 has many light-shielding plates 65 serving as detected parts at its periphery such that the light-shielding plates 65 are arranged like the teeth of a comb and extend perpendicularly. The balls 28 and the springs 29 are arranged in a position opposed to the operational-feel providing portion 64 in the lower casing 11 at the same spacing as the diameter of the operational-feel providing portion 64. As a result, when a state in which the operation component 1 is not operated, as shown in FIG. 2, is shifted to a state in which the rotatable unit 27 is rotated about the rotation center O, movements occurring when the balls 28 roll on the small protrusions 63 are conveyed to the turning knob 34 through the cylindrical portion 61, so that the user can have a required operational feel.

As described above, in this embodiment, the operational-feel providing portion 64 of the rotatable unit 27, the balls 28, and the springs 29 function as means for providing a turn-operation feel.

As shown in FIG. 9, a light-emitting element 71 and a photoreceptor element 72, which are included in each of the photo-interrupters 30*a* and 30*b*, are arranged on opposite sides of a path for the light-shielding plate 65 therebetween.

The upper casing 32 includes the cylindrical panel-mounting portion 81 for covering the periphery of the rotatable unit 27 and a plane portion 82 for covering the top surface of the lower casing 11 and is secured to the lower casing 11 by the screws 33. The outer diameter of the panel-mounting portion 81 is smaller than the length and width of the lower casing 11.

As shown in FIG. 2, the joystick input device according to this embodiment, as described above, is mounted to a panel P having a cylindrical input-device holding portion A with the operation component 1 exposed.

The panel P in this embodiment has an overhanging portion B for covering a multilevel section defined between the lower casing 11 and the panel-mounting portion 81, a projecting portion C protruding from the overhanging portion B in the longitudinal direction of the panel-mounting portion 81, and the cylindrical input-device holding portion A having a diameter slightly larger than that of the outer diameter of the panel-mounting portion 81. For the joystick input device according to this embodiment, before the operation component 1 and the turning knob 34 are mounted, the joystick input device is mounted to the panel P by inserting the panel-mounting portion 81 into the cylindrical input-device holding portion A and then connecting the plane portion 82 of the upper casing 32 and the overhanging portion B of the panel P together by connecting means, such as screws. The operation component 1 and the turning knob 34 are then mounted to the knob holder 8 and the rotatable unit 27, respectively. When the panel-mounting portion 81 is inserted into the cylindrical input-device holding portion A, ribs 83 (see FIG. 1) formed on the periphery of the panel-mounting portion 81 may be used as detents.

The operation of the joystick input device according to this embodiment, as discussed above, will now be described below.

As shown in FIG. 2, when the joystick input device is not operated, the tiltable component 19 stands perpendicular to the lower casing 11 and the operation component 1 is positioned at the top of the joystick input device relative to the lower casing 11. Accordingly, pushing force with the operation of the operation component 1 is not generated and therefore is not exerted on the push-detecting-switch rubber contact 15 and the tilt-detecting-switch rubber contacts 16. As a result, neither the push-detecting switch nor the tilt-detecting switches output a switching signal. In addition, since the rotatable unit 27 is not turned, the photo-interrupters 30*a* and 30*b* do not output a rotation-detecting signal.

From this state, when the operation component 1 is tilted in one direction, as shown in FIG. 3, the tiltable component 19 is then tilted to the tilt direction of the operation component 1. The driving legs 19*c* of the tiltable component 19 press one or two driving bars, which are arranged in the tilt direction of the tiltable component 19, of the tilt-detecting-switch driving bars 18, and then, pushing force is exerted on corresponding tilt-detecting-switch rubber contact(s) 16, thus elastically deforming one or two of the tilt-detecting-switch rubber contacts 16 in a selective manner. As a result, the movable contact(s) that are formed on the elastically-deformed tilt-detecting-switch rubber contact(s) 16 and corresponding fixed contact(s) formed on the second wiring board(13 are electrically connected together, and therefore, one or two of the tilt-operation switches output a switching signal.

In a state in which the tiltable component 19 is tilted, if the operation component 1 is subjected to a push operation in the axial direction of the pushable component 7, a further push operation of the pushable component 7 is regulated since the leading edge of the pushable component 7 is in contact with the pushable-component stopping portion 11*c* of the tiltable-component supporter 11*a*. Therefore, the fixed contact and the movable contact of the push-detecting switch are not electrically connected.

From a state in which the joystick input device is not operated, when the turning knob 34 is turned, the rotatable unit 27 is then turned in the operational direction and the light-shielding plates 65, which are arranged like the teeth of a comb, cross a gap defined between the light-emitting element 71 and the photoreceptor element 72 of each of the photo-interrupters 30*a* and 30*b*. Therefore, the photo-interrupters 30*a* and 30*b* output rotation-detecting signals on the basis of photoreceptor signals supplied from the photoreceptor element 72. When the turning knob 34 is turned, the balls 28 roll on the small protrusions 63 in succession. The movements occurring during this time are conveyed to the turning knob 34 through the rotatable unit 27 so that the user can have a required operational feel.

From a state in which the joystick input device is not operated, when the operation component 1 is pushed in the axial direction of the pushable component 7, as shown in FIG. 4, the pushable component 7 presses the push-detecting-switch driving bar 17 down and resulting pushing force is exerted on the push-detecting-switch rubber contact 15, thus elastically deforming the push-detecting-switch rubber contact 15. As a result, the movable contact formed on the elastically-deformed push-detecting-switch rubber contact 15 and the corresponding fixed contact formed on the second wiring board 13 are electrically connected together, and therefore, the push-detecting switch outputs a switching signal.

In a state in which the operation component 1 is pushed and the leading edge of the pushable component 7 passes through the pushable-component through-hole 11*b*, if the operation component 1 is subjected to a tilt operation in the tilt direction of the tiltable component 19, a further tilt operation of the tiltable component 19 is regulated since the outer face of the pushable component 7 comes into with the inner face of the pushable-component through-hole 11*b*. As a result, the fixed contacts and the movable contacts of the tilt-detecting switches are not electrically connected.

In the joystick input device according to this embodiment, the tiltable-component supporter 11*a* has the pushable-component through-hole 11*b* and the pushable-component stopping portion 11*c* so that a tilt operation of the tiltable component 19 and a push operation of the pushable component 7 are not simultaneously performed. For example, when a cursor movement appearing on a display unit of a car navigation system is controlled on the basis of a contact signal output from the tilt-detecting switches upon tilting of the tiltable component 19 and a selection from menu buttons appearing on the display unit of the car navigation system is controlled on the basis of the a contact signal output from the push-detecting switch upon pushing of the pushable component 7, the selection from menu buttons performed by pushing the pushable component 7 is not carried out unless a cursor is moved by titling the tiltable component 19 up to a position where a desired menu button is displayed and the operation component 1 is then moved back to a position in which the joystick input device is not operated. As a result, an undesired menu button is not selected, and the user can control these operations without having to look at the joystick input device with reliability.

In the joystick input device according to the above-described embodiment, the cylindrical panel-mounting portion 81 accommodating the tilt shaft 19*b* and being inserted into the cylindrical input-device holding portion A of the panel P is mounted to the lower casing 11 accommodating the driving legs 19*c* and the tilt-detecting means 16. Compared to a known joystick input device having no such panel-mounting portion, the tilt shaft 19*b* of the joystick input device of this embodiment can be longer by the length of the panel-mounting portion 81, and therefore, the radius of tilt of the operation component 1 can be longer. As a result, the operation component 1 has the operational feel of nearly parallel movement without complicating the structure. Since the joystick input device is mounted to the panel P by inserting the cylindrical panel-mounting portion 81 into the cylindrical input-device holding portion A of the panel P, the length of a section that protrudes from the surface of the panel P in the operation component 1 is reduced. Therefore, when the joystick input device is used as a controller of an automotive electrical system, the look of the car's interior and the safety are good.

In the joystick input device according to the above-described embodiment, the projecting portion C protruding from the overhanging portion B of the panel P in the longitudinal direction of the panel-mounting portion 81, the turning knob 34 joined to the rotatable unit 27 is disposed between the projecting portion C and the operation component 1, and the length of the tilt shaft 19*b* is adjusted to this arrangement. As a result, compared to a joystick input device that has just the panel-mounting portion 81, the radius of tilt of the operation component 1 can be longer, and therefore, the operation component 1 can have the operational feel of more nearly parallel movement.

Since the joystick input device according to the above-described embodiment is mounted to the panel P having the overhanging portion B and the projecting portion C protruding in the longitudinal direction of the panel-mounting portion 81, the panel P can accommodate a required electric component, such as a switch S, or a wiring board K, as shown in FIG. 2. An inner space can be used effectively.

Figure 10:
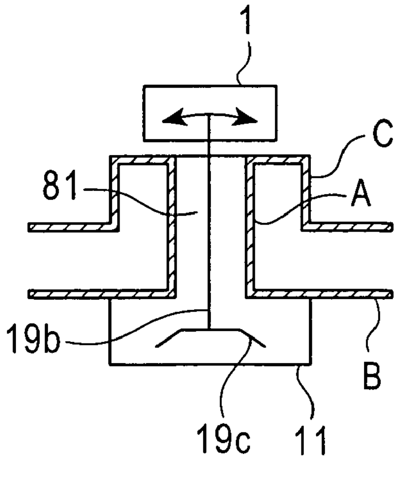
FIG. 10 schematically shows the structure of a joystick input device according to another embodiment.

The joystick input device according to the above-described embodiment has the rotatable unit 27 and the turning knob 34 for rotating the rotatable unit 27. However, the present invention is not limited to this. As shown in FIG. 10, the rotatable unit 27 and the turning knob 34 may be omitted. In this case, the radius of tilt of the operation component 1 can be longer by the length of the projecting portion C, and therefore, the operation component 1 can have the operational feel of nearly parallel movement.

Figure 11:
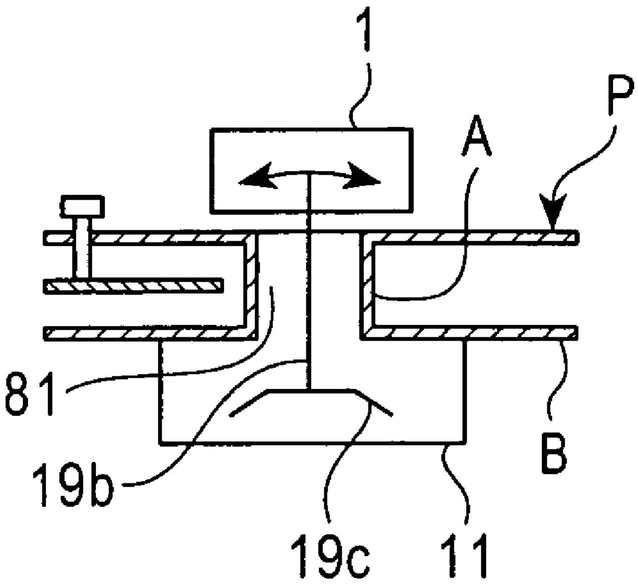
FIG. 11 schematically shows the structure of a joystick input device according to another embodiment.

In the joystick input device according to the above-described embodiment, the panel P has the projecting portion C. However, the present invention is not limited to this. As shown in FIG. 11, the projecting portion C may be omitted. In this case, the radius of tilt of the operation component 1 can be longer by the length of the overhanging portion B, and therefore, the operation component 1 can have the operational feel of nearly parallel movement and the inner space of the overhanging portion B can be used effectively.

Figure 12:
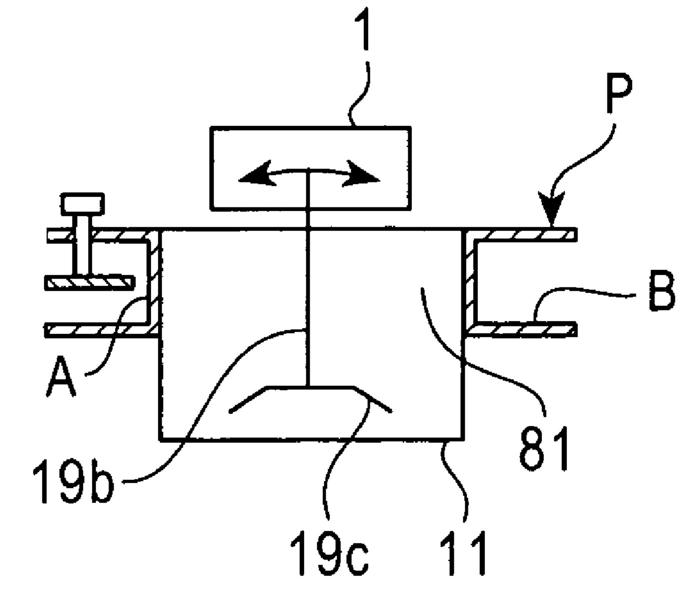
FIG. 12 schematically shows the structure of a joystick input device according to another embodiment.
Figure 13:
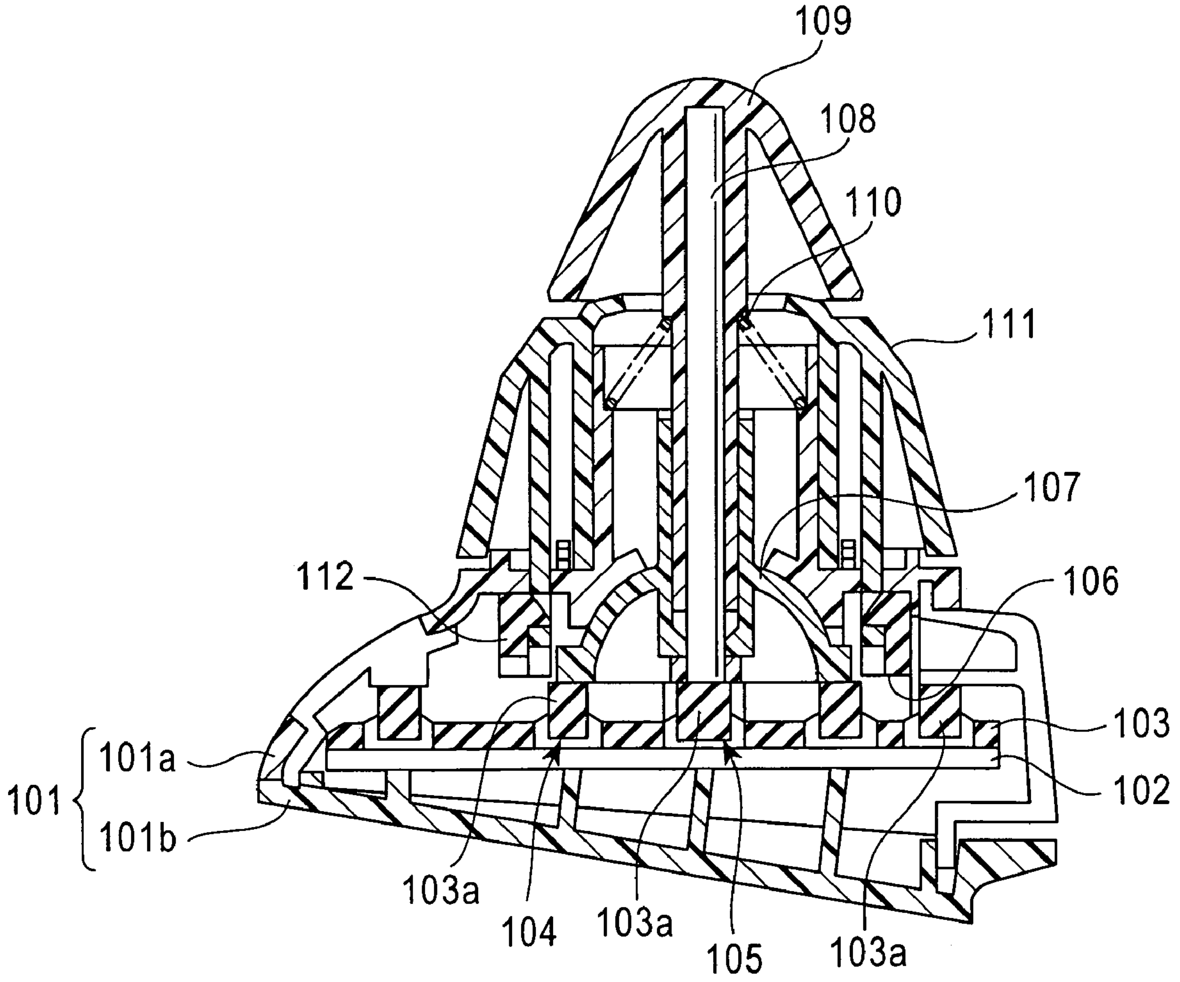
FIG. 13 PRIOR ART
FIG. 13 is a cross-sectional view of a known joystick input device.

In the joystick input device according to the above-described embodiment, the size (the outer diameter) of the panel-mounting portion 81 is smaller than the size (the length and width) of the lower casing 11. However, the present invention is not limited to this. As shown in FIG. 12, both sizes can be the same. In this case, the radius of tilt of the operation component 1 can be longer by the length of the overhanging portion B, and therefore, the operation component 1 can have the operational feel of nearly parallel movement and the inner space of the overhanging portion B can be used effectively.

What is claimed is:

1. A joystick input device comprising:

a casing having a tiltable-component supporter;

a tiltable component held by the tiltable-component supporter and extending in a direction away from a tilt center;

tilt-detecting means for detecting a state of tilting of the tiltable component;

a pushable component held by the tiltable component;

push-detecting means for detecting a state of pushing of the pushable component; and an operation component for performing a tilt operation of the tiltable component and a push operation of the pushable component, wherein the casing has an operation-regulating portion disposed away from the tilt center, and the operation-regulating portion comprising a pushable-component through-hole configured to receive a leading edge of the pushable component a pushable-component stopping portion disposed around a peripheral portion of the pushable-component through-hole, wherein the operation-regulating portion prevents the tilt operation when the pushable component is received through the pushable-component through-hole, and wherein the operation-regulating portion prevents the push operation when the tiltable component is tilted, to prevent simultaneous pushing and tilting operations.

2. The joystick input device according to claim 1, wherein the operation-regulating portion is disposed adjacent to the operation component away from the tilt center.

3. The joystick input device according to claim 2, wherein the tiltable-component supporter includes the operation-regulating portion having the pushable-component through-hole and the pushable-component stopping portion at a spherical sliding contact face thereof, and a sliding portion of the tiltable component slides on the sliding contact face so that the tiltable component is tiltably held.

4. A joystick input device comprising:

a tiltable component having a tilt shaft and driving legs extending radially from an end of the tilt shaft;

tilt-detecting means for detecting a direction of tilting of the tiltable component, the tilt-detecting means being driven by the driving legs;

a tilt-operation knob attached to an opposing end of the tilt shaft; and a casing accommodating the driving legs and the tilt-detecting means, wherein the joystick input device is mounted to a panel having a cylindrical input-device holding portion with the tilt-operation knob exposed;

a panel-mounting portion extending in an axial direction of the tilt shaft, accommodating the tilt shaft, and being inserted into the cylindrical input-device holding portion of the panel is mounted to the casing; and wherein an outer diameter of the panel-mounting portion is smaller than a length and width of the casing, and the joystick input device is mounted to the panel having an overhanging portion covering a multilevel section between the panel-mounting portion and the casing.

5. The joystick input device according to claim 4 wherein the joystick input device is mounted to the panel having a projecting portion protruding from the overhanging portion in a longitudinal direction of the panel-mounting portion.

6. The joystick input device according to claim 5, further comprising:

a cylindrical rotatable unit accommodated inside the panel-mounting portion; and a turning knob connected to the rotatable unit and disposed between the projecting portion and the tilt-operation knob.

* * * * *